United States Patent Office 2,740,783
Patented Apr. 3, 1956

2,740,783

STEROIDS

John A. Hogg and Alan H. Nathan, Kalamazoo Township, Kalamazoo County, Mich., assignors to The Upjohn Company, Kalamazoo, Mich., a corporation of Michigan No Drawing. Application October 24, 1952,
Serial No. 316,802

12 Claims. (Cl. 260—239.57)

This invention relates to a novel class of steroid compounds and is more particularly concerned with steroid-epoxy-lacto-enol acylates and a process for the production and the hydrolysis thereof.

It is an object of the present invention to provide the novel class of steroids named herein as steroid-epoxy-lacto-enol acylates. Another object is the provision of a process for the production of steroid-epoxy-laceto-enol-acylates as well as the hydrolysis thereof. A further object of this invention is a process of selective epoxidation restricted to the 17(20) position without concomitant formation of a 22(23) epoxy bond. Other objects will be apparent to those skilled in the art to which this invention pertains.

The novel compounds of the present invention, the steroid-epoxy-lacto-enol-acylates, and the sequence disclosed herein for their production and use, may be represented by the following formulas:

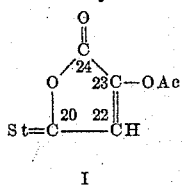 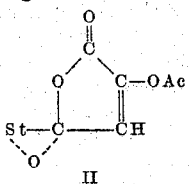 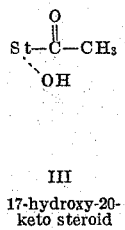

| I | II | III |
|---|---|---|
| Steroid-lacto-enol acylate | Steroid-epoxy-lacto-enol acylate | 17-hydroxy-20-keto steroid | wherein St represents a cyclopentanopolyhydrophenanthrene radical having the indicated bonds attached at carbon atom 17, and wherein Ac represents the acyl radical of an organic carboxylic acid. These compounds are produced by reacting a steroid having the Formula I given above, e. g., a 21-normethyl-23-acyloxy-17(20), 22-choladieno-24(20)-lactone which compounds possess a 17(20) double bond, with an epoxidizing agent, e. g., an organic peracid or hydrogen peroxide. Subsequent hydrolysis results in a 17-hydroxy steroid compound having Formula III above.

The preferred starting compounds of the present invention and the preferred 17(20)-oxido-21-normethyl-23-acyloxy-22-choleno-24-lactones produced therefrom, as well as the hydrolysis thereof, may be graphically represented as follows:

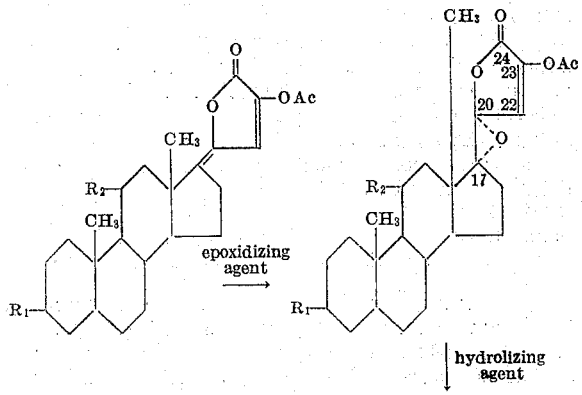

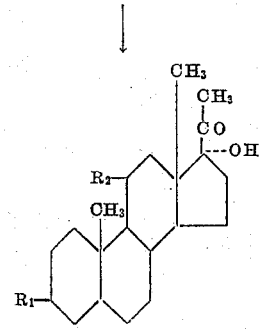

wherein $R_1$ is selected from the group consisting of hydrogen, ketonic oxygen, and acyloxy, acyloxy being of the formula AcO, wherein Ac is the acyl radical of an organic carboxylic acid, especially such acids containing from one to eight carbon atoms inclusive, wherein $R_2$ is selected from the group consisting of hydrogen, ketonic oxygen and acyloxy having the above definition, wherein Ac is an acyl radical as defined above and wherein the steroid nuclei may have the normal or allo configuration. The indicated steroid nucleus may also have other substituents, such as hydroxy, acyloxy, ketonic oxygen, halo, or the like, at positions of the molecule other than those indicated as well as one or more double bonds, as at position 4(5) or 5(6) of the nucleus. If the steroid nucleus contains one or more double bonds, these may also be converted to oxido linkages by the reaction with an epoxidizing agent, which will also be hydrolyzed during the hydrolysis step of the process.

According to te method of the present invention, a steroid-lacto-enol-acylate is contacted with an epoxidizing agent to produce a steroid-epoxy-lacto-enol-acylate as described above, especially a 17(20)-oxido-21-normethyl-23-acyloxy-22-choleno-24(20)-lactone, which may then be hydrolyzed to give the corresponding 17α-hydroxy-20-keto-steroid.

The novel compounds of the present invention are useful precursors to steroids possessing a 17α-hydroxy group such as, for example, Kendall's compound E acetate (17α - hydroxy - 21-acetoxy-4-pregnene-3,11,20-trione) or Kendall's compound F acetate (11β,17α-dihydroxy-21-acetoxy4-pregnene-3,20-dione). For example, treatment of 3α,23 - diacetoxy-11-keto-17(20)-oxido-21-normethyl-22-choleno-24(20)-lactone (Example 1) with sodium hydroxide, as described in Example 1A, is productive of the known 3α,17α-dihydroxypregnane-11,20-dione, which can be converted to cortisone acetate by the procedure of Kritchevisky, et al., J. Am. Chem. Soc., 74, 483 (1952). Similarly, other lacto-enol acylates of the present invention are converted to steroids possessing a 17α-hydroxy group.

The novel compounds of the present invention are well-defined, crystalline, stable compounds which are insoluble in water and soluble in dilute base. They are not only useful precursors to known and physiologically active steroids but are useful in the preparation of entirely new types of steroids possessing a fifth ring attached to carbon atom 17.

In carrying out the process of the present invention, a steroid having formula I supra, e. g., a 21-normethyl-23-acyloxy-17(20),22-choladieno-24(20)-lactone, is contacted with an epoxidizing agent, preferably at a temperature of about minus twenty to 45 degrees centigrade and in an organic solvent, to produce a 17(20)-oxido-21-normethyl-23-acyloxy-22-choleno-24(20)-lactone, which may then be hydrolyzed to give the desired 17-hydroxy-20-ketosteroid.

Since the progress of the epoxidation reaction can be followed by iodometric titration, the completion of the reaction can be readily ascertained. At room temperature the reaction time required may range from six to twelve hours, while at lower temperatures as long as three or four days may be required.

The epoxidation step of the present invention is conveniently carried out in an organic solvent which is non-reactive under the conditions of reaction. Reaction solvents which may be used include benzene, chloroform, dichloromethylene, hexane hydrocarbons, methanol, dioxane, mixtures of one or more of the above, or the like.

Representative epoxidizing agents which may be used in the method of the present invention include perbenzoic acid, mono-perphthalic acid, peracetic acid, and others, with perbenzoic acid being preferred. Isolation of the epoxy steroid compound (Formula II supra), e. g., a 17(20)-epoxy - 21 - normethyl - 23 - acyloxy-22-choleno-24(20)-lactone, is conveniently achieved by eliminating the excess epoxidizing agent through washing with sodium bisulfite, sodium bicarbonate, potassium carbonate, dilute sodium or potassium hydroxide solution, or the like, followed by washing with water and evaporating the solution. Alternatively, the reaction product can be used directly for the hydrolysis step, or can be purified by recrystallization from a solvent, such as methanol, ethanol, benzene, hexanes, chloroform, mixtures of the foregoing, or the like.

The hydrolysis of the epoxy steroid compound II, e. g., a 17(20)-epoxy-21-normethyl - 23 - acyloxy-22-choleno-24(20)-lactone, which is obtained by the epoxidation reaction, is conveniently carried out by alkaline treatment, e. g., by dissolving the compound in an alkaline solution. If the epoxy steroid is in short contact with the alkaline solution, as shown in Example 1A, a partial hydrolysis occurs which is productive of the water soluble alkali salt of an organic acid. The organic acid, which is insoluble in water can be isolated by neutralizing the alkaline solution with a dilute acid, such as hydrochloric acid, sulfuric acid or the like. Further treatment of the organic acid with alkali in water solution causes complete hydrolysis and is productive of the desired 17α-hydroxy-20-ketosteroid (compound III). Prolonged contact of the epoxy steroid with aqueous alkaline solution causes complete hydrolysis to the 17α-hydroxy-20-ketosteroid. The bases used in the hydrolysis may be, for example, alcoholic or alcoholic-aqueous solutions of sodium hydroxide, potassium hydroxide, barium hydroxide, sodium or potassium alkoxide, alcoholic or alcoholic-aqueous suspensions of calcium or strontium hydroxide, or the like. Preferred are ethanol and methanol solutions of sodium hydroxide and potassium hydroxide. The time required for the hydrolysis may be from two minutes to ten minutes, although much longer periods, e. g., up to several hours or even longer, depending on the conditions of hydrolysis, the exact reactants employed, and whether or not it is desired to carry out the hydrolysis in one step or two steps as discussed above.

The following preparations and examples are illustrative of the process and products of the present invention but are not to be construed as limiting.

PREPARATION 1.—SODIUM ENOLATE OF 21-ETHOXYOXALYL-3-α-HYDROXYPREGNANE-11,20-DIONE

To a mixture of 3.4 milliliters of a 3.4 N solution of methanolic sodium methoxide, 19.5 milliliters of dry benzene and 0.5 milliliter of absolute ethanol, said mixture having been distilled until approximately eight milliliters of distillate had been collected and the mixture then cooled, was added 2.3 milliliters of ethyl oxalate with stirring followed by a solution of 3.32 grams (0.01 mole) of 3α-hydroxypregnane-11,20-dione in a mixture of thirty milliliters of dry benzene and five milliliters of absolute ethanol. The reaction mixture was stirred for 85 minutes during which time some solid material precipitated. Sixty milliliters of anhydrous ether was then added thereto and the whole stirred for an additional hour whereafter an additional 100 milliliters of anhydrous ether was added thereto. The ivory colored sodium enolate of 21-ethoxyoxalyl-3α-hydroxypregnane-11,20-dione thus-precipitated was filtered, washed with ether and after drying in a vacuum desiccator over Drierite (anhydrous calcium sulfate) was found to weigh 3.65 grams, a yield of 85 percent of the theoretical. The product melted above 250 degrees centigrade.

A. 21-GLYOXALIC ACID OF 3α-HYDROXYPREGNANE-11,20-DIONE

Five hundred and sixty milligrams of the sodium enolate of 21-ethoxyoxalyl-3α-hydroxypregnane-11,20-dione was dissolved in a solution of seventy milligrams of potassium hydroxide in fifteen milliliters of a solution composed of equal parts of water and alcohol, whereafter the whole was heated for fifteen minutes on a steam bath. The cooled solution was then filtered and upon acidification there was slowly deposited 345 milligrams of a white crystalline precipitate of the 21-glyoxalic acid of 3α-hydroxy-pregnane-11,20-dione. The infrared analysis of said compound in solution (chloroform) vertified the structure proposed.

Analysis.—Percent calculated for $C_{23}H_{32}O_6$: C, 68.29; H, 7.97. Found: C, 68.12; H, 7.87.

In the same manner as described in Preparation 1 and 1A, the 21-glyoxalic acids of the following compounds are prepared by reacting the corresponding 17-acetoxy-steroids with ethylglyoxalate in the presence of a base and hydrolyzing the product thereof: 21-glyoxalic acid of 3β-hydroxypregnane-11,20-dione, progesterone, 11-ketoprogesterone, 11α - hydroxyprogesterone, 11β - hydroxyprogesterone, 3α- and 3β - hydroxy - 5 - pregnane - 20 - one, 3α- and 3β-hydroxy-20-one, pregnane-3,20-dione, 11α- and 11β - hydroxypregnane - 20 - one, pregnane-3,11,20-trione, 3α,11α-, 3α,11β-, 3β,11α-, and 3β,11β-dihydroxypregnane-20-one, 11α- and 11β-hydroxypregnane-3,20-dione, the allo steroids corresponding to these and other like steroids, organic carboxylic acid esters of the foregoing hydroxysteroids, and the like.

PREPARATION 2.—3α,23-DIACETOXY-11-KETO-21-NORMETHYL-17(20),22-CHOLADIENO-24(20)-LACTONE

A mixture of 2.918 grams of 3α-hydroxypregnane-11,20-dione-21-glyoxalic acid, 3.8 milliliters of a normal solution of hydrogen bromide in acetic acid, fifteen milliliters of acetic anhydride, and fifteen milliliters of glacial acetic acid was heated for one-half hour at the reflux temperature of the reaction mixture whereafter the volatile components were removed by distillation at reduced pressure. The distillation residue was triturated with water until crystallization occurred. The crude crystalline mass was filtered and washed with water and thereafter dried. The yield of dry 3α,23-diacetoxy-11-keto-21-normethyl-17(20),22-choladieno-24(20)-lactone melting at about 145 to 155 degrees centigrade with softening at 130 degrees was 3.395 grams, representing a quantitative yield. Several recrystallizations from methanol or a mixture of ether and Skellysolve "B" hexane hydrocarbons in the proportion of about thirty milliliters of solvent per gram of product raises the melting point to 210 to 210.5 degrees centigrade.

Analysis.—Percent calculated for $C_{27}H_{34}O_7$: C, 68.91; H, 7.28. Found: C, 68.81; H, 7.04.

PREPARATION 3.—3,11-DIKETO-21-NORMETHYL-23-ACETOXY-17(20),22-CHOLADIENO-24(20)-LACTONE

In the same manner as described in Preparation 2, 3,11-diketo-23-acetoxy - 21 - normethyl-17(20),22-choladieno-24(20)-lactone is prepared from the 21-glyoxalic acid of pregnane-3,11,20-trione by treatment of the latter with acetic anhydride in pyridine.

PREPARATION 4.—3β,23-DIACETOXY-11-KETO-21-NOR-METHYL-17(20),22-CHOLADIENO-24(20)-LACTONE

In the same manner as described in Example 1, 3β,23-diacetoxy - 11 - keto - 21 - normethyl - 17(20) - chola - dieno-24(20)-lactone is prepared by reacting 3β-hydroxypregnane-11,20-dione-21-glyoxalic acid with acetic anhydride in pyridine. Isolation of the thus-produced 3β,23-diacetoxy - 11 - keto - 21 - normethyl - 17(20),22 - choladieno-24(20)-lactone is achieved by distillation of the reaction mixture and crystallizing the distillation residue from methanol.

In the same manner as described in Preparations 2 through 4, the 23-acyloxy homologues of these and other steroids wherein the acyloxy group has the formula AcO, Ac being the acyl radical of an organic carboxylic acid such as, for example, formic, acetic, propionic, butyric, valeric, hexanoic, heptanoic, octanoic, benzoic, or the like, are prepared by reacting the anhydride of the selected organic carboxylic acid or formic acid, if formyloxy is the desired acyloxy radical, with the 21-glyoxalic acid of the selected steroid in a solvent such as, for example, pyridine, collidine, picoline, acetic acid, propionic acid, or the like.

Representative compounds, prepared from these 21-glyoxalic acids in the manner described in Preparations 2 through 4 include: 3α,23-diacetoxy-11β-hydroxy-21-normethyl - 17(20),22 - choladieno - 24(20) - lactone, 3α,11α,23 - triacetoxy - 21 - normethyl - 17(20),22 - choladieno - 24(20) - lactone, 3,11 - diketo - 21 - nor - methyl - 23 - acetoxy - 4,17(20),22 - cholatrieno - 24(20) - lactone, 3 - keto - 11α,23 - diacetoxy - 21 - normethyl - 4,17(20),22 - cholatrieno - 24(20) - lactone, 3 - keto - 11β - hydroxy - 21 normethyl - 23 - acetoxy - 17(20),22 - choladieno - 24(20) - lactone, 11α,23 - diacetoxy - 21 - normethyl - 17(20),22 - choladieno - 24(20) - lactone, 11β - hydroxy - 21 - normethyl - 23 - acetoxy - 17(20), 22 - choladieno - 24(20) - lactone, 3 - keto - 11β - hydroxy - 21 - normethyl - 23 - acetoxy - 4,17(20),22 - cholatrieno - 24(20) - lactone, 3α,23 - diacetoxy - 21 - normethyl - 17(20),22 - choladieno - 24(20) - lactone, 3β,23 - diacetoxy - 21 - normethyl - 17(20),22 - choladieno - 24(20) - lactone, 3 - keto - 21 - normethyl - 23 - acetoxy - 17(20),22 - choladieno - 24(20) - lactone, 3,11 - diketo - 21 - normethyl - 23 - acetoxy - 17(20),22 - choladieno - 24(20) - lactone, 3α,23 - diacetoxy - 21 - normethyl - 5,17(20),22 - cholatrieno - 24(20) - lactone, 3β,23 - diacetoxy - 21 - normethyl - 5,17(20),22 - chola - trieno - 24(20) - lactone, 3β,11α,23 - triacetoxy - 21 - normethyl - 17(20),22 - choladieno - 24(20) - lactone, 3β,11β,23 - triacetoxy - 21 - normethyl - 17(20),22 - choladieno - 24(20) - lactone, 3 - keto - 11α,23 - diacetoxy - 21 - normethyl - 17(20),22 - choladieno - 24 (20) - lactone, 3α,23 - dipropionoxy - 11 - keto - 21 - normethyl - 17(20),22 - choladieno - 24(20) - lactone, 3β,23 - dibutyroxy - 11 - keto - 21 - normethyl - 17(20), 22 - choladieno - 24(20) - lactone, 3 - keto - 21 - normethyl - 23 - valeroxy - 17(20),22 - choladieno - 24(20) - lactone, 3,11 - diketo - 21 - normethyl - 23 - hexanoyloxy - 17(20),22 - choladieno - 24(20) - lactone, 11β - hydroxy - 3 - keto - 21 - normethyl - 23 - heptanoyloxy - 17(20),22 - choladieno - 24(20) - lactone, 3α,23 - dioctanoyloxy - 21 - normethyl - 17(20),22 - choladieno - 24(20) - lactone, 3β,23 - diformoxy - 21 - normethyl - 17(20),22 - choladieno - 24(20) - lactone, 3α,11α - 23 - triformyloxy - 21 - normethyl - 17(20),22 - choladieno - 24(20) - lactone, 3α,23 - dibenzoyloxy - 11β - hydroxy - 21 - normethyl - 17(20),22 - choladieno - 24(20) - lactone, 3β,11α,23 - triformyloxy - 21 - normethyl - 17(20),22 - choladieno - 24(20) - lactone, 3β,23 - diformyloxy - 11β - hydroxy - 21 - normethyl - 17(20),22 - choladieno - 24(20 - lactone and others.

Contacting one of the above-named steroids, or the like, in an organic solvent, e. g., chloroform with an organic peracid, e. g., perbenzoic acid, or hydrogen peroxide followed by treatment with an aqueous alkali-metal hydroxide, e. g., sodium hydroxide, introduces a 17α-hydroxy group into the steroid nucleus, as shown in the following.

Example 1.—3α,23 - diacetoxy - 11 - keto - 17(20) - oxido-21-normethyl-22-choleno-24(20)-lactone A solution of 0.80 gram of 3α,23-diacetoxy-11-keto-21-normethyl-17(20),22-choladieno-24(20)-lactone, melting at 210 to 210.5 degrees centigrade, obtained according to the method described in Preparation 2, was dissolved in twenty milliliters of chloroform and mixed at room temperature with twenty milliliters of a solution of perbenzoic acid in benzene containing 61 milligrams of perbenzoic acid per milliliter. The consumption of the perbenzoic acid was followed by iodometric titration of aliquot samples taken from time to time from the reaction mixture. After about eight hours, one molar equivalent of perbenzoic acid had been consumed and the consumption of perbenzoic acid thereafter essentially ceased. The reaction mixture was washed with successive portions of a dilute aqueous sodium bisulfite solution, sodium bicarbonate solution, and finally with water. After drying the benzene-chloroform layer with anhydrous sodium sulfate and thereafter distilling the solvent therefrom, an amorphous white powdery residue was obtained which crystallized upon trituration with 25 milliliters of denatured alcohol. The alcohol was then heated to boiling to dissolve all the crystalline residue and was thereafter cooled, whereupon 437 milligrams, a yield of 66 percent of the theoretical, of white needles of 3α,23-diacetoxy-11-keto - 17(20) - oxido - 21 - normethyl - 22 - choleno - 24(20)-lactone, melting at 179.5 to 181.5 degrees centigrade, crystallized therefrom. Further recrystallization of these crystals from alcohol gave a product melting at 191 to 192 degrees centigrade (corrected).

*Analysis.*—Percent calculated for $C_{27}H_{34}O_6$: C, 66.65; H, 7.04. Found: C, 66.85; H, 6.86.

Example 1A.—3α,17α-dihydroxypregnane-11,20-dione

A solution of fifty milligrams of 3α,23-diacetoxy-11-keto - 17(20) - oxido - 21 - normethyl - 22 - choleno - 24(20)-lactone, obtained according to the method described in Example 1, dissolved in two milliliters of 95 percent ethanol, was heated to boiling and contacted while hot with about 0.5 milliliter of 1 Normal aqueous sodium hydroxide and the whole heated at the boiling point of the reaction mixture for five minutes whereafter it was maintained at room temperature for sixteen hours. The solution was then made acidic with dilute hydrochloric acid whereupon 42 milligrams of a white solid organic acid precipitated which, upon drying, melted at about 144 to 150 degrees centigrade and had the following analysis: Found: C, 68.55; H, 7.52.

These crystals of the organic acid were dissolved in two milliliters of a 1 Normal sodium hydroxide solution and heated on a steam bath for about five minutes, where upon 15.2 milligrams of white crystals of 3α,17α-dihydroxypregnane-11,20-dione, melting at 195.5 to 199 degrees centigrade, precipitated. Recrystallization of these crystals from dilute methanol raised the melting point of the product to 203 to 204.5 degrees centigrade which was not depressed upon taking a mixed melting point with authentic 3α,17α-dihydroxypregnane-11,20-dione.

Example 2.—3,11-diketo-17(20)-oxido-21-normethyl-23-acetoxy-22-choleno-24(20)-lactone In the same manner as described in Example 1, 3,11-diketo - 17(20) - oxido - 21 - normethyl - 23 - acetoxy - 22-choleno-24(20)-lactone is prepared by treatment of 3,11 - diketo - 21 - normethyl - 23 - acetoxy - 17(20),22 - choladieno-24(20)-lactone with perbenzoic acid in benzene. The consumption of perbenzoic acid is followed by iodometric titration of aliquot samples and the product thus-obtained is isolated as shown in Example 1 and purified by recrystallization from methyl alcohol.

A. 17α-HYDROXYPREGNANE-3,11,20-TRIONE

In the same manner as described in Example 1A, 3,11-diketo-17(20)-oxido-21-normethyl-23-acetoxy- 22-choleno-24(20)-lactone is hydrolyzed by treatment with alcoholic sodium hydroxide, followed by aqueous sodium hydroxide to give 17α-hydroxypregnane-3,11,20-trione.

*Example 3.—3β,23-diacetoxy-11-keto-17(20)oxido-21-normethyl-22-choleno-24(20)-lactone*

In the same manner described in Example 1, 3β,23-diacetoxy-11-keto-21-normethyl-17(20), 22-choladieno-24(20)-lactone, when treated with perphthalic acid in a mixed solvent consisting of fifty percent chloroform and fifty percent benzene, is productive of 3β,23-diacetoxy-11-keto-17(20)-oxido-21-normethyl-22-choleno - 24(20) - lactone.

A. 3β,17α-DIHYDROXYPREGNANE-11,20-DIONE

In the same manner as given in Example 1A, 3β,23-diacetoxy - 11-keto - 17(20) - oxido - 21 - normethyl - 22 - choleno-24(20)-lactone is hydrolyzed by treatment with sodium ethoxide and sodium hydroxide in 95 percent ethyl alcohol to give 3β,17α-dihydroxy-pregnane-11,20-dione.

*Example 4.—3α,11α,23-triacetoxy-17(20)-oxido-21-normethyl-22-choleno-24(20)-lactone*

In the same manner as described in Example 1, 3α,11α,23 - triacetoxy - 17(20) - oxido- 21 -normethyl-22-choleno-24(20)-lactone is prepared by epoxidation of 3α,11α,23-triacetoxy-21-normethyl-17(20),22 - choladieno - 24(20)-lactone with perbenzoic acid.

A. 3α,11α,17α-TRIHYDROXYPREGNANE-20-ONE

In the same manner as shown in Example 1A, 3α,11α,17α-trihydroxypregnane-20-one is prepared by treatment of 3α,11α,23-triacetoxy-17(20)-oxido-21-normethyl-22-choleno-24(20)-lactone with alcoholic sodium hydroxide, followed by aqueous sodium hydroxide.

In the same manner as described in Examples 1 through 5, the 17(20)-oxido-23-acyloxy homologues of these and other steroids are prepared wherein the acyloxy group has the formula AcO, Ac being the radical of an organic carboxylic acid such as, for example, formic, acetic, propionic, butyric, valeric, hexanoic, heptanoic, octanoic, benzoic, or the like, by epoxidation of the corresponding 21-normethyl-23-acyloxy-17(20),22-choladieno-24(20)-lactone with a selected epoxidizing agent in a solvent, such as chloroform, dichloromethane, benzene, toluene, mixtures of these, or the like.

Representative compounds prepared as described in Examples 1 through 5 from the corresponding 17(20) unsaturated starting steroid include: 11α,23-diacetoxy-17(20)-oxido-21-normethyl-22-choleno- 24(20) - lactone, 3α,23-diacetoxy-17(20)-oxido-21-normethyl -22- choleno-24(20)-lactone, 3β,23-diacetoxy-17(20)-oxido - 21 - normethyl-22-choleno-24(20)-lactone, 3-keto-17(20)-oxido-21-normethyl-23-acetoxy-22-choleno-24(20)-lactone, 3β,-11α,23-triacetoxy-17(20)-oxido-21-normethyl-22-choleno-24(20)-lactone, 3-keto-11α,23-diacetoxy-17(20)-oxido-21-normethyl, 22-choleno-24(20)-lactone, 3α,23-dipropionoxy-11-keto-17(20)-oxido - 21 - normethyl - 22 - choleno - 24(20)-lactone, 3β,23-dibutyroxy-11-keto-21-normethyl-17(20)-oxido-22-choleno-24(20)-lactone, 3-keto-17(20)-oxido-21-normethyl-23-valeroxy-22-choleno-24(20) - lactone, 3,11-diketo-17(20)-oxido-21-normethyl-23-hexanoyloxy-22-choleno-24(20)-lactone, 3α,23 - dioctanoyl - 17 - (20)-oxido-21-normethyl-22-choleno-24(20)-lactone, 3β,-23-diformoxy-17(20)-oxido-21-normethyl-22-choleno - 24-(20) - lactone, 3α,11α,23 - triformoxy - 17(20) - oxido - 21-normethyl-22-choleno-24(20)-lactone, 3β,11α,23-triformoxy-17(20)-oxido-21-normethyl-22-choleno-24(20) - lactone, and others. These may then be converted by hydrolysis as disclosed previously to the corresponding 17α-hydroxy-20-ketosteroids, such as, for example, 11α,17α-dihydroxypregnane - 3,21 - dione, 11α,17α-dihydroxypregnane-20-one, 3α,17α- and 3β,17α-dihydroxypregnane-20-one, 17α-hydroxypregnane-3,20-dione, 3β,11α,17α-trihydroxypregnane-20-one, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of 3α,17α-dihydroxy-11-keto-pregnane-20-one which comprises: contacting 3α,23-diacetoxy-11-keto-21-normethyl-17(20),22-choladieno-24(20)-lactone with an epoxidizing agent selected from organic peracids, in an organic solvent and at a temperature between about minus twenty and 45 degrees centigrade, to produce 3α,23-diacetoxy-11-keto-17(20)-oxido-21-normethyl-22-choleno-24(20)-lactone, and hydrolyzing the latter compound with a base, selected from the group of alkali-metal bases, earth alkali-metal bases and alkali-metal alkoxides, in a solvent, to produce 3α,17α-dihydroxy-11-ketopregnane-20-one.

2. A process for the production of 17α-hydroxypregnane-3,11,20-trione which comprises: contacting 3,11-diketo-21-normethyl-23-acetoxy - 17(20),22 - choladieno - 24(20)-lactone with an epoxidizing agent selected from organic peracids, in an organic solvent and at a temperature between about minus twenty and 45 degrees centigrade, to produce 3,11-diketo-17(20)-oxido-21-normethyl-23-acetoxy-22-choleno-24(20)-lactone, and hydrolyzing the latter compound with a base, selected from the group of alkali-metal bases, earth-alkali-metal bases and alkali-metal alkoxides, in a solvent, to produce 17α-hydroxypregnane-3,11,20-trione.

3. A process for the production of 3β,17α-dihydroxypregnane-11,20-dione which comprises: contacting 3β,23-diacetoxy-11-keto-21-normethyl - 17(20),22 - choladieno - 24(20)-lactone with an epoxidizing agent selected from organic peracids, in an organic solvent and at a temperature between about minus twenty and 45 degrees centigrade, to produce 3β,23-diacetoxy-11-keto-17(20)-oxido-21-normethyl-22-choleno-24(20)-lactone, and hydrolyzing the latter compound with a base, selected from the group of alkali-metal bases, earth-alkali-metal bases and alkali-metal alkoxides, in a solvent to produce 3β,17α-dihydroxypregnane-11,20-dione.

4. A process for the production of 3α,11α,17α-trihydroxypregnane-20-one which comprises: contacting 3α,-11α,23-triacetoxy-21-normethyl - 17(20),22 - choladieno - 24(20)-lactone with an epoxidizing agent, selected from organic peracids, in an organic solvent and at a temperature between about minus twenty and 45 degrees centigrade to produce 3α,11α,23-triacetoxy-17(20)-oxido-21-normethyl-22-choleno-24(20)-lactone, and hydrolyzing the latter compound with a base, selected from the group of alkali-metal bases, earth-alkali-metal bases and alkali-metal alkoxides dissolved in a solvent to produce 3α,11α,-17α-trihydroxypregnane-20-one.

5. 3α,23 - diacetoxy - 11 - keto - 17(20) - oxido - 21-normethyl-22-choleno-24(20)-lactone of the formula:

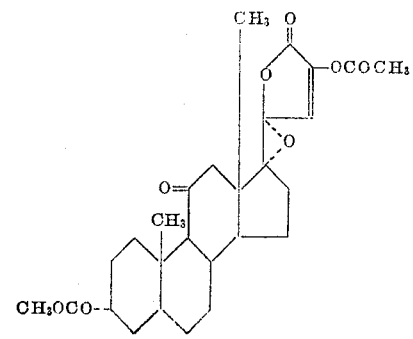

6. 3,11 - diketo - 17(20) -oxido - 21 - normethyl-23- acetoxy-22-choleno-24(20)-lactone of the formula:

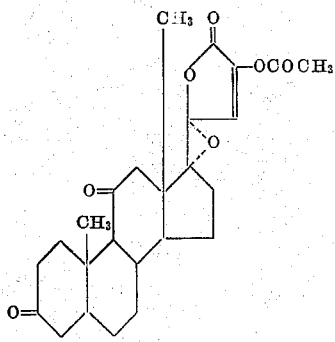

7. 3β,23 - diacetoxy - 11 - keto - 17(20) - oxido - 21-normethyl-22-choleno-24(20)-lactone of the formula:

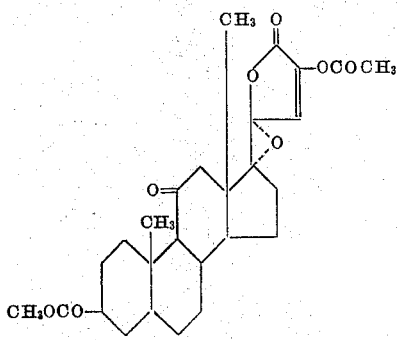

8. 3α,11α,23 - triacetoxy - 17(20) - oxido - 21 - normethyl-22-choleno-24(20)-lactone of the formula:

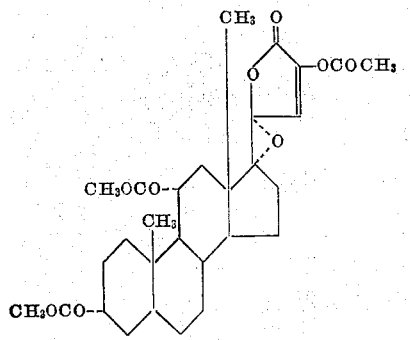

9. A process for the production of a 17,20-oxido-21-normethyl-23-acyloxy-22-choleno - 24(20) - lactone which consists in reacting at a temperature between about minus twenty and 45 degrees centigrade, a 21-normethyl-23-acyloxy-17(20),22-choladieno-24(20)-lactone, represented by the following formula:

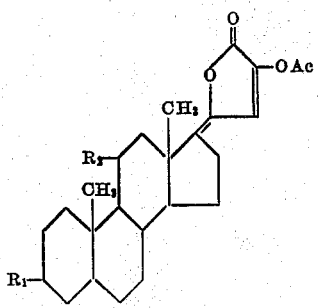

wherein $R_1$ is selected from the group consisting of ketonic oxygen and an acyloxy group having the formula AcO, wherein $R_2$ is selected from the group consisting of hydrogen, ketonic oxygen, and an acyloxy group of the formula AcO, and wherein Ac in any case is the acyl radical of a hydrocarbon carboxylic acid containing up to and including eight carbon atoms, with an epoxidizing agent selected from the group consisting of organic peracids and hydrogen peroxide, to cause epoxidation of the 17(20) double bond.

10. A process for the production of a 17α-hydroxy-20-ketopregnane which comprises epoxidizing a 21-normethyl - 23 - acyloxy - 17(20),22 - choladieno - 24(20)-lactone (I), with an organic peracid in an organic solvent, to give a 17(20)-oxido-21-normethyl-23-acyloxy-22-choleno-24(20)-lactone (II), and hydrolyzing II with a base to give a 17α-hydroxy 20-ketopregnane (III), as represented by the following sequence:

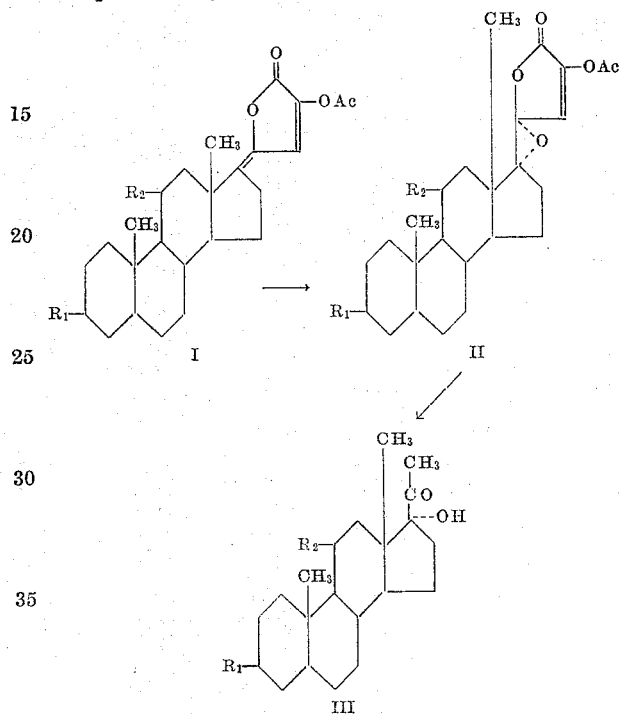

wherein $R_1$ is selected from the group consisting of ketonic oxygen and an acyloxy group having the formula AcO, wherein $R_2$ is selected from the group consisting of hydrogen, ketonic oxygen, and an acyloxy group of the formula AcO, and wherein Ac in any case is the acyl radical of a hydrocarbon carboxylic acid containing up to and including eight carbon atoms.

11. The process of claim 10 in which the hydrolyzing agent is an alkali-metal hydroxide in an aqueous alcohol.

12. A 17,20 - oxido - 21 - normethyl - 23 - acyloxy-22-choleno-24(20)-lactone represented by the following formula:

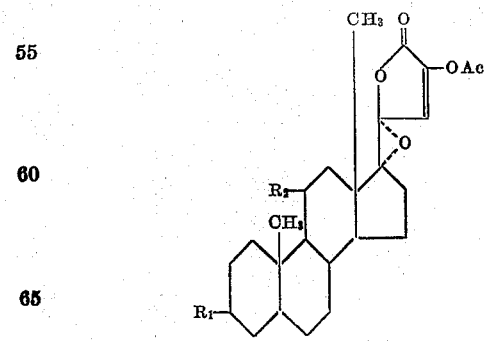

wherein $R_1$ is selected from the group consisting of ketonic oxygen and an acyloxy group having the formula AcO; wherein $R_2$ is selected from the group consisting of hydrogen, ketonic oxygen, and an acyloxy group of the formula AcO; and wherein Ac in any case is the acyl radical of a hydrocarbon carboxylic acid containing up to and including eight carbon atoms.

No references cited.